United States Patent
Molander et al.

(10) Patent No.: US 8,616,033 B2
(45) Date of Patent: Dec. 31, 2013

(54) METHOD AND SYSTEM FOR VIBRATION DAMPING AND SHAPE CONTROL OF A SUSPENDED METAL STRIP

(75) Inventors: Mats Molander, Vasteras (SE); Robert Stal, Stockholm (SE); Peter Rybing, Vasteras (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 13/302,829

(22) Filed: Nov. 22, 2011

(65) Prior Publication Data

US 2012/0067096 A1   Mar. 22, 2012

Related U.S. Application Data

(63) Continuation of application No. PCT/EP2009/056698, filed on Jun. 1, 2009.

(51) Int. Cl.
*B21D 55/00* (2006.01)

(52) U.S. Cl.
USPC ............... 72/3; 242/419.3; 118/673; 361/144

(58) Field of Classification Search
USPC ............ 72/16.1, 16.2, 16.3, 16.4, 17.3, 18.1, 72/18.2, 18.6, 19.6, 109, 199, 250, 419; 427/430.1, 430; 700/109; 361/144; 118/673; 242/419.3
See application file for complete search history.

(56) References Cited

U.S. PATENT DOCUMENTS

| | | | |
|---|---|---|---|
| 3,661,116 A * | 5/1972 | Moskowitz et al. | 118/673 |
| 4,655,166 A * | 4/1987 | Nishimura et al. | 118/673 |
| 6,158,260 A * | 12/2000 | Ginzburg | 72/9.1 |
| 6,471,153 B1 * | 10/2002 | Kimura et al. | 242/419.3 |
| 7,187,532 B2 * | 3/2007 | Eriksson et al. | 361/144 |
| 7,361,385 B2 * | 4/2008 | Kabeya et al. | 427/431 |
| 8,062,711 B2 * | 11/2011 | Lofgren et al. | 427/433 |
| 8,239,170 B2 * | 8/2012 | Wegerich | 702/189 |
| 2008/0044584 A1 * | 2/2008 | Eriksson et al. | 427/430.1 |
| 2010/0161104 A1 * | 6/2010 | Lofgren et al. | 700/109 |
| 2010/0209591 A1 * | 8/2010 | Eriksson et al. | 427/8 |

FOREIGN PATENT DOCUMENTS

| | | |
|---|---|---|
| JP | 8120433 A | 5/1996 |
| WO | 2009030269 A1 | 3/2009 |

OTHER PUBLICATIONS

International Search Report and Written Opinion of the International Searching Authority; Application No. PCT/EP2009/056698; Issued Jan. 26, 2010; Mailing Date: Feb. 5, 2010; 12 pages.

* cited by examiner

*Primary Examiner* — Dana Ross
*Assistant Examiner* — Homer Boyer
(74) *Attorney, Agent, or Firm* — St. Onge Steward Johnston & Reens LLC

(57) ABSTRACT

A method for vibration damping and shape control of a suspended metal strip is provided. The method includes the steps of: measuring distance to the metal strip by a plurality of non-contact sensors, providing distance measurements; generating a deflection profile based on the distance measurements; decomposing the deflection profile to a number of base shapes; and controlling the deflection profile by a plurality of non-contact actuators. The step of controlling includes providing for each of the base shapes a corresponding combination of force profiles.

13 Claims, 4 Drawing Sheets

METHOD AND SYSTEM FOR VIBRATION DAMPING AND SHAPE CONTROL OF A SUSPENDED METAL STRIP

CROSS-REFERENCE TO RELATED APPLICATIONS

The present application is a continuation of pending International patent application PCT/EP2009/056698 filed on Jun. 1, 2009 which designates the United States and the content of which is incorporated herein by reference.

FIELD OF THE INVENTION

The invention relates generally to the field of metal working industry, and more specifically to means and methods for controlling movements of metal strips.

BACKGROUND OF THE INVENTION

The handling of metal strips or metal sheets in a metal working industry involves transportation thereof along different processing lines, such as for example hot-dip galvanizing lines. The metal strips are prone to vibration during the movements owing to their relative thinness and elongated shape and due to a number of sources of vibration. Vibrations occur, among other things, due to imperfections in the line's mechanical components, and due to different process steps, for example air-knife actions used for blowing off excess zinc from the metal strips after a galvanization step. The transportation of the metal strips therefore requires stabilization.

Without stabilization, the metal strips would be subject to shape loss, e.g. bending, and several processing steps would be less efficient. For example, the lack of vibration control during the mentioned air-knife actions would result in variable thickness of the zinc coating and thus lessened product quality and increased costs. The processing of the metal strips would thus be rendered inefficient and expensive. The importance of controlling the movements of the metal strips is thus readily realized.

Published International patent publication WO 2009/030269 discloses a method for stabilizing and controlling the vibrations of metals strips. The profile of the metal strip is controlled by a plurality of non-contact actuators based on a combination of mode shapes, wherein the combination of mode shapes approximates the metal strip profile. The metal strip profile and the forces acting on the metal strip are expressed as combinations of the mode shapes, using the same number of mode shapes as there are actuators.

SUMMARY OF THE INVENTION

It is a general object of the present invention to provide methods and means for controlling the movement of metal strips, for example metal strips being processed in a processing line.

It is a particular object of the invention to provide methods and means for obtaining an improved vibration damping and shape control of metal strips being processed in a processing line.

These objects, among others, are achieved by a method for vibration damping and/or shape control of a suspended metal strip.

In accordance with the invention, a method for vibration damping and shape control of a suspended metal strip is provided. The method comprises the steps of: measuring distance to the metal strip by a plurality of non-contact sensors, providing distance measurements; generating a deflection profile based on the distance measurements; decomposing the deflection profile to a number of base shapes; and controlling the deflection profile by a plurality of non-contact actuators. The step of controlling comprises providing for each base shape a corresponding combination of force profiles. By means of the invention, the decoupling between deflection shapes and the degree of freedom are increased compared to known methods. Further, flexibility is obtained in that the number of actuators can be adapted in dependence on the needs of the particular application at hand.

In accordance with an embodiment of the invention, each corresponding combination of force profiles is based on at least a first force profile calculated at a first height and a second force profile calculated at a second height. An increased accuracy is thereby provided, in that the total force applied to the metal strip can be formed with a shape closer to the optimal one.

In accordance with another embodiment of the invention, the plurality of non-contact actuators is arranged along the width of the metal strip at the first height and at the second height of the metal strip. An improved stabilization is thereby provided, and consequently an improved efficiency of the metal strip processing. Such efficiency increase can be translated into an increased profit margin.

In accordance with still another embodiment of the invention, the step of determining the contributions from the base shapes comprises determining coefficients for the respective contributions. The coefficients may then be used for determining an amplitude for a combination of force profiles corresponding to a particular base shape. An efficient and accurate method for determining the base shape contributions and corresponding combinations of force profiles is thus provided. The method may also thereby be easily implemented in software.

In accordance with still another embodiment of the invention, the number of non-contact actuators and/or sensors is independent of the number of base shapes.

In accordance with still another embodiment of the invention, the method comprises the further step of providing a total force applied to the metal strip by the non-contact actuators by adding together all the combinations of force profiles.

In accordance with yet another embodiment of the invention, at least two rows of sensors are arranged at a first and a second height of the metal strip and the method comprises the further steps of determining a first deflection profile at the first height and determining a second deflection profile at the second height, performing shape control of the metal strip based on the first deflection profile and performing vibration control based on the second deflection profile. The forces applied by the actuators may be divided into a slowly varying part used to provide the shape control and a fast varying part around the levels provided by signals of the slowly varying part used for providing the vibration control. Different actuator forces may thus be used in dependence on the needs. The placement of the actuators may also be adapted in dependence on the intended aim of the movement control. For vibration control the actuator forces are preferably arranged as close to the sensors as possible, while this is less critical for the shape control.

In accordance with yet another embodiment of the invention, the step of controlling the deflection profile comprises optimizing the first and second force profiles so as to provide in mean a maximally flat deflection of the metal strip.

The invention also provides a system for vibration damping and shape control, whereby advantages similar to the above are achieved.

Further features and advantages thereof will become clear upon reading the detailed description of embodiment of the invention and the accompanying drawings.

DETAILED DESCRIPTION OF THE INVENTION

The invention is based on the realization by the inventors that the invention disclosed in the earlier mentioned patent publication WO 2009/030269, assigned to the same applicant as the present application, can be given a further increased decoupling and increased degree of freedom.

Figure 1A:
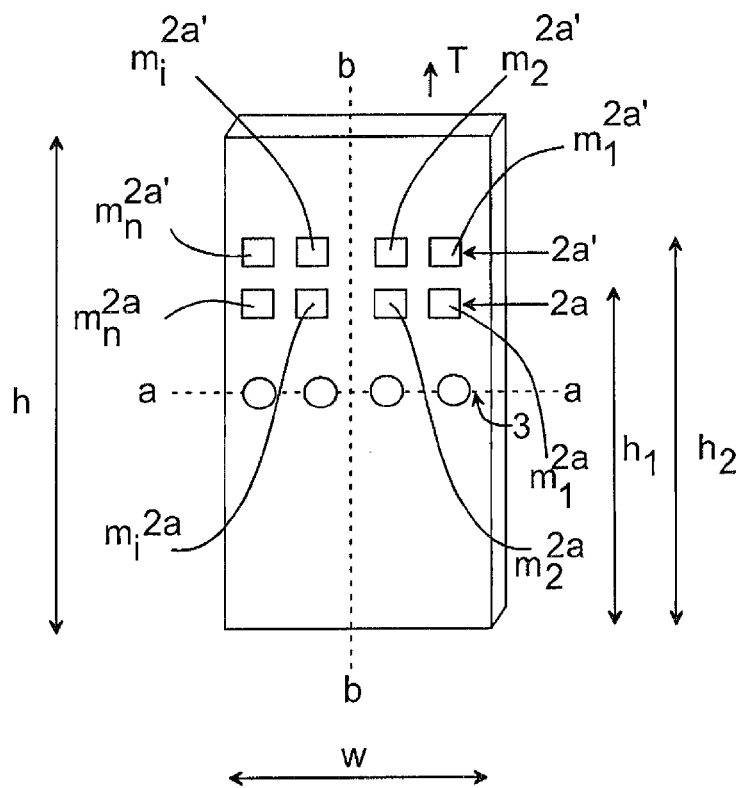
FIGS. 1a and 1b illustrate in different views an arrangement of sensors and actuators on a metal strip.

FIG. 1a illustrates an embodiment of the present invention, and in particular an arrangement of sensors and actuators on a metal strip. The metal strip 1 is illustrated in a side view with the travel direction indicated with an arrow and the letter "T" and the height of the metal strip 1 indicated at "h". In a typical processing line, the metal strip 1 may be several kilometers long. The term height "h" as used herein may thus be understood to comprise a subset of the total length of the metal strip. The height "h" is thus a "snapshot" of a part of the metal strip when it passes a stabilization arrangement (not illustrated) comprising actuators and sensors.

Figure 1B:
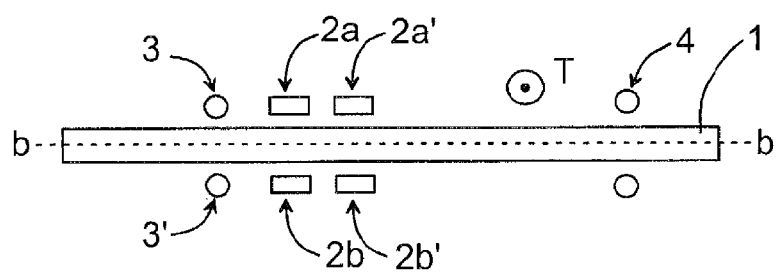

A number of sensors 3, for example inductive position sensors, are arranged in the stabilization arrangement in one or more rows along the width w of the metal strip profile, in an embodiment on both sides of the metal strip 1 (as shown in FIG. 1b). The sensors 3 are non-contact sensors and are thus not in physical contact with the metal strip 1. The sensors 3 are arranged to measure the distance to the metal strip 1, thereby providing distance measurements. The number of sensors 3 can be suitably chosen, but should be at least as many as there are base shapes.

A number of actuators $m_i^{2a}$, $m_i^{2a'}$ for example electromagnets, are arranged in one or more rows 2a, 2a' along the width of the metal strip 1 and, if several rows are used, at different heights thereof. The reference numerals 2a and 2a' thus refer to a respective row of actuators $m_1^{2a}, m_2^{2a}, \ldots, m_i^{2a}, \ldots m_n^{2a}$ and $m_1^{2a'}, m_2^{2a'}, \ldots, m_i^{2a'}, \ldots, m_n^{2a'}$ arranged along the width of the metal profile 1 at different heights $h_1$, $h_2$. The actuators $m_i^{2a}$, $m_i^{2a'}$ generates forces acting on the metal strip 1. In the following, the actuators $m_i^{2a}$, $m_i^{2a'}$ are exemplified by electromagnets, but it is realized that the actuators could be other types of non-contact actuators.

FIG. 1b illustrates the arrangement of FIG. 1a in a view along line a-a. As mentioned, there may be an additional row of sensors 3' on the opposite side of the metal strip 1. Further, a second row of sensors 4, 4' on each side of the metal strip 1 may also be provided, as illustrated in the figure. Any number of sensors and any number of rows of sensors may be used. In the case of the actuators being electromagnets, the forces used for controlling the movements of the metal strip 1 are magnetic forces, and there is then at least one row 2b, 2b' of electromagnets $m_i^{2b}$, $m_i^{2b'}$ arranged on each side of the metal strip 1. One coil from each electromagnet forms a pair $m_i^{2a}$, $m_i^{2b}$ of coils which are controlled together in order to stabilize the metal strip 1. The magnetic forces acting on the metal strip 1 can be controlled by regulating the electric current supplied to the electromagnets. In the figures only two rows 2a, 2b; 2a', 2b' of electromagnets are illustrated on each side of the metal strip, but in accordance with the invention, the number of electromagnets $m_i^{2a}$, $m_i^{2b}$, $m_i^{2a'}$, $m_i^{2b'}$ can be suitably chosen in dependence on the application at hand.

The distance measurements performed by the sensors 3 enable the calculation of a metal strip profile, in the following denoted deflection profile. The deflection profile is the shape of the metal strip 1 as seen in a view in accordance with FIG. 1b and at the height of the metal strip 1 corresponding to the height at which the sensors 3 are arranged.

The deflection profile can be expressed as a linear combination of a number of natural modes or natural vibrations, in the following denoted base shapes of vibration or shortly base shapes.

Figure 2A:
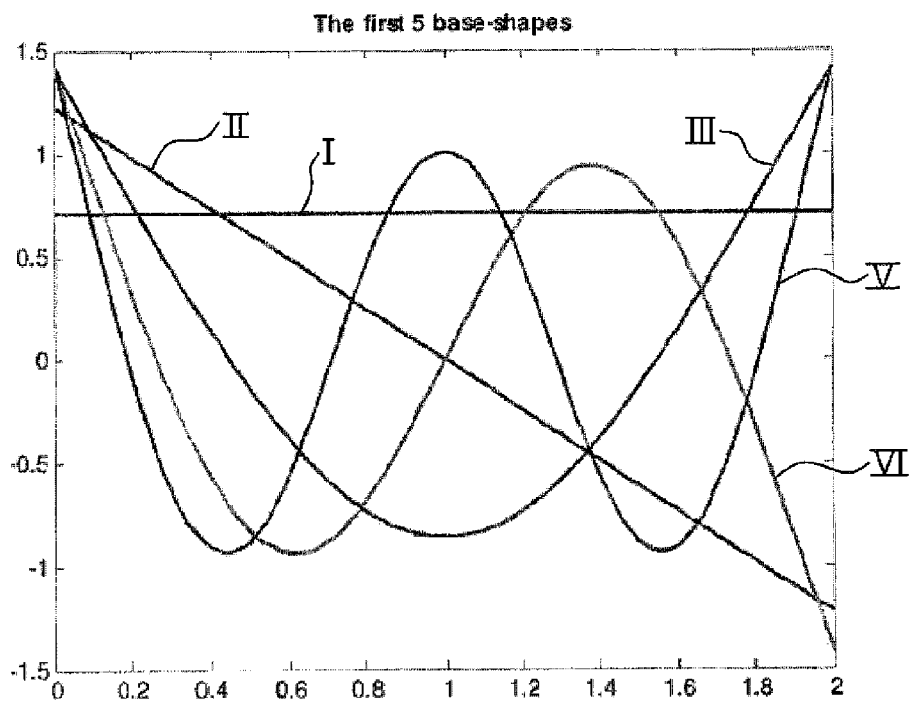
FIGS. 2a-2c illustrates base shapes of vibrations.

FIG. 2a illustrates the first five base shapes, numbered by Roman numerals I, II, III, IV and V, respectively. There is, in theory, an infinite number of base shapes, but in the following the five first base shapes are used for illustrating the invention. The number of base shapes used for estimating the deflection profile may be chosen in view of balancing the computational effort and desired accuracy.

Figure 2B:
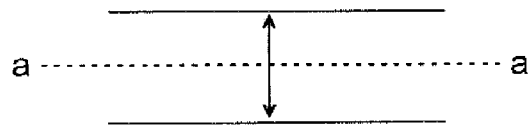
Figure 2C:
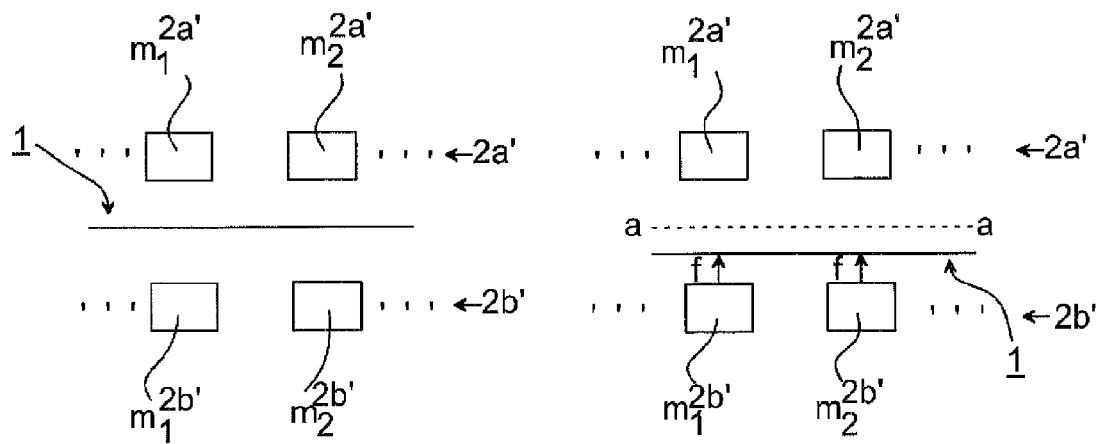

FIG. 2b illustrates the first base shape I in another representation, from which it is seen that the base shape I deflection corresponds to a linear translation from the center line a-a. FIG. 2c illustrates how two of the electromagnets of rows 2a' and 2b' act on the metal strip 1 in order to minimize the deflection. In particular, the electromagnets $m_i^{2a}$, $m_i^{2b}$, $m_i^{2a'}$, $m_i^{2b'}$ are controlled in such a way as to provide a magnetic force that counteracts the deflection caused by vibrations. In the particular case illustrated in the figure, the force from electromagnets $m_1^{2a'}$ and $m_2^{2a'}$ of row 2a' could for example be zero, while the electromagnets $m_1^{2b'}$ and $m_2^{2b'}$ of row 2b' arranged on the opposite side of the metal strip provide an equal magnetic force f. The other row(s) of electromagnets act on the metal strip 1 in a corresponding way, supporting the first row in counteracting the measured deflections. That is, act to counteract the deflections at that particular height. The other base shapes are controlled in a corresponding way.

Based on the deflection profile, which in turn is determined based on the distance measurements provided by the sensors, a specific force shape is provided with the aim to obtain a desired metal strip profile. The desired metal strip profile is typically a profile that is as flat as possible, i.e. following the centerline a-a as well as possible. The total force or total force profile expresses how the electromagnets $m_1^{2a}, m_2^{2a}, \ldots, m_i^{2a}, \ldots m_n^{2a}$ and $m_1^{2a'}, m_2^{2a'}, \ldots, m_i^{2a'}, \ldots, m_n^{2a'}$ should be tuned so as to provide a force acting on the metal strip 1 in a way so that the effects of vibrations are best counteracted.

For each base shape I, II, III, IV, V a controller is provided that controls a respective base shape. For example, for base shape I, a first controller is provided that calculates, based on distance measurements obtained from all sensors 3, a combination of force profiles that best counteracts the deflection contribution caused by base shape I. A force profile is a pre-specified combination of forces from individual electromagnet pairs $m_i^{2a}$, $m_i^{2b}$ for one base shape at a particular height.

In the case of using a single row of actuators acting on the metal strip 1 at some height, a deflection profile at that height is calculated and decomposed into the different base shapes I, II, III, IV, V. For base shape I, a first controller determines a pre-specified combination of force profiles, and determines an amplitude A1. For example, the pre-specified combination may be: (force 1 applied by actuator pair $m_1^{2a}$, $m_1^{2b}$+force 1 applied by actuator pair $m_2^{2a}$, $m_2^{2b}$). This pre-specified combination of forces is then multiplied with the amplitude A1, which is suitably determined in dependence on the contribution from base shape I to the deflection profile. For base shape II, a second controller determines a pre-specified combination of force profiles for base shape II, and a corresponding amplitude A2, etc. That is, a first force profile is calculated for base shape I, the first force profile being a pre-specified combination of forces from individual electromagnet pairs $m_i^{2a}$, $m_i^{2b}$ for base shape I; a second force profile is calculated for base shape II, the second force profile being a pre-specified combination of forces from individual electromagnet pairs $m_i^{2a}$, $m_i^{2b}$ for base shape II, etc. A total force may then be determined and applied to the metal strip 1 by the actuators by adding together all combinations of force profiles.

If an additional row of actuators is provided at a different height, then a combination of force profiles at the different heights is provided.

For example, a first force profile for base shape I at height $h_1$ could be expressed as: (force 1 applied by actuator pair $m_1^{2a}$, $m_1^{2b}$+force 1 applied by actuator pair $m_2^{2a}$, $m_2^{2b}$)*amplitude $Ah_1$. A second force profile for base shape I at height $h_2$ could be expressed as (0.99*force 1 applied by actuator pair $m_1^{2a'}$, $m_1^{2b'}$+1.0*force 1 applied by actuator pair $m_2^{2a'}$, $m_2^{2b'}$)*amplitude $Ah_2$. The controller controlling base shape I comprises pre-specified combinations of such amplitudes $Ah_1$, $Ah_2$ and determines an amplitude A in dependence on the contribution from base shape I to the deflection profile. One or more force profiles may be determined for a particular height of the metal strip 1.

A second controller is provided that calculates a combination of force profiles that best counteracts the deflection contribution caused by base shape II, a third controller is provided that calculates a combination of force profiles that best counteracts the deflection contribution caused by base shape III etc. For each base shape I, II, III, IV, V a combination of force profiles can be determined, that in some sense is the "best" combination of force profiles. "Best" in this context is in most cases the combination of force profiles that to the highest degree counteracts the contributions from a particular base shape to the deflection.

If deflection profiles are determined at several heights, then a combination of force profiles at the different heights is provided.

It is noted that the controller designated for controlling a particular base shape may be a single unit or several units; for example in the case of the controller being a PID (proportional-integral-derivative), it could be divided into the three units: P, I and D, respectively.

All controllers are decoupled from each other, determining a respective combination of force profiles for a respective base shape. The total force to be applied to the metal strip 1 is then determined by combining the different controllers' combinations of force profiles into an actual electromagnet response. That is, the total force is a sum of all force profiles including any respective amplitude, and the sum possibly being multiplied by some amplitude.

While the earlier mentioned patent publication WO 2009/030269, assigned to the same applicant as the present application, uses the same number of base shapes as there are actuators, the present invention provides an increased decoupling and higher degree of freedom by using any number of actuators and any number of actuator rows. A particular actuator row may thus comprise any number of actuators, the number not being related to the number of base shapes used.

Briefly, in accordance with the present invention, the concept of controlling individual base shapes is preserved, but instead of controlling as many base shapes as there are electromagnets, linearly independent force profiles are formed along a deflection profile, and in a preferred embodiment also at different heights. One deflection profile is controlled by manipulating the amplitude of one combination of force profiles. The force profiles are chosen so as to achieve optimal decoupling between the deflection shapes.

One controller controls one particular base shape, but its output force profile is based on at least two force profiles, for example a force profile at height $h_1$ and another force profile at height $h_2$. There are preferably at least two parallel rows 2a, 2b; 2a', 2b' of electromagnets. The number of electromagnets or the number of electromagnet rows along the width of the metal strip 1 is not linked to the number of controlled base shapes. A larger number of electromagnets can be used in order to achieve force profiles that approximate the desired ones with a higher accuracy. Further, the number of sensors is not either linked to the number of controlled base shapes, asides from the earlier mentioned constraint of requiring as many sensors as there are base shapes. By increasing the number of sensors, the accuracy in the estimations of the deflection shapes is improved.

One approach for accomplishing the decoupling between the deflection shapes is to apply force profiles that are identical to the base shapes approximating the deflection shape.

Figure 3:
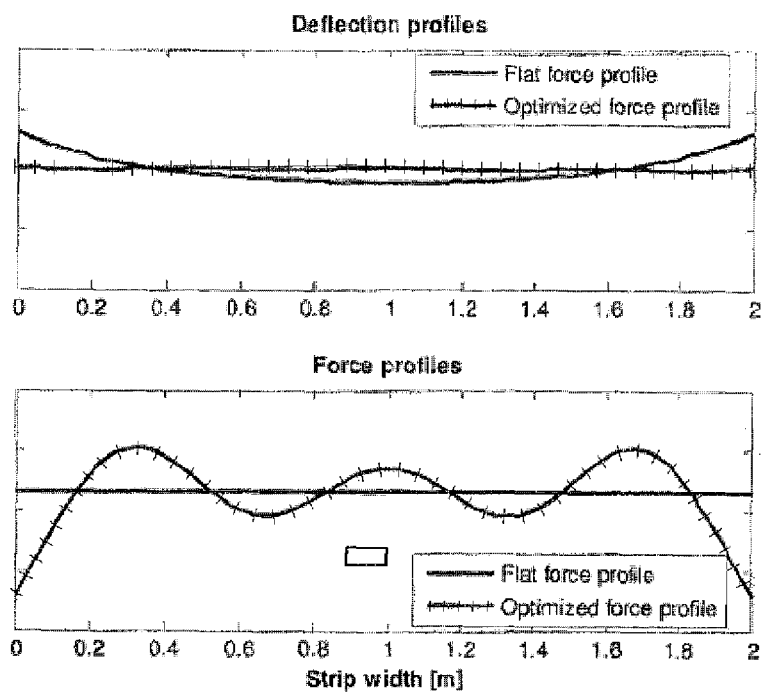
FIG. 3 illustrates deflection profiles as a result of different force profiles.

Another approach for accomplishing the decoupling is illustrated in FIG. 3. The upper figure shows a simulated steady state deflection along a cross section of a metal strip for two different force profiles. The lower figure illustrates these two force profiles, one denoted "flat force profile" and the other denoted "optimized force profile". The optimized force profile, which is not identical to the base shape, can be seen to provide a better result. It is however noted that the deflection profiles illustrated in the upper figure are shown in a magnified scale and that both deflection profiles in practice are quite flat.

Normally, the coupling between different deflection shapes is larger dynamically than at steady state. Let $s_i$ denote the response in one deflection shape to the amplitudes of one force profile $f_j$. The aim is to minimize this response at all frequencies when the indices i and j differ. This minimization is a more difficult task than to achieve decoupling at steady state only.

In accordance with an embodiment of the invention, at least two rows of electromagnets are applied, i.e. forces are applied at more than one cross section of the metal strip. Stated differently, at least two rows of electromagnets are provided, that provide a force on the metal strip at two different heights, i.e. at two different cross sections, of the metal strip.

Figure 4:
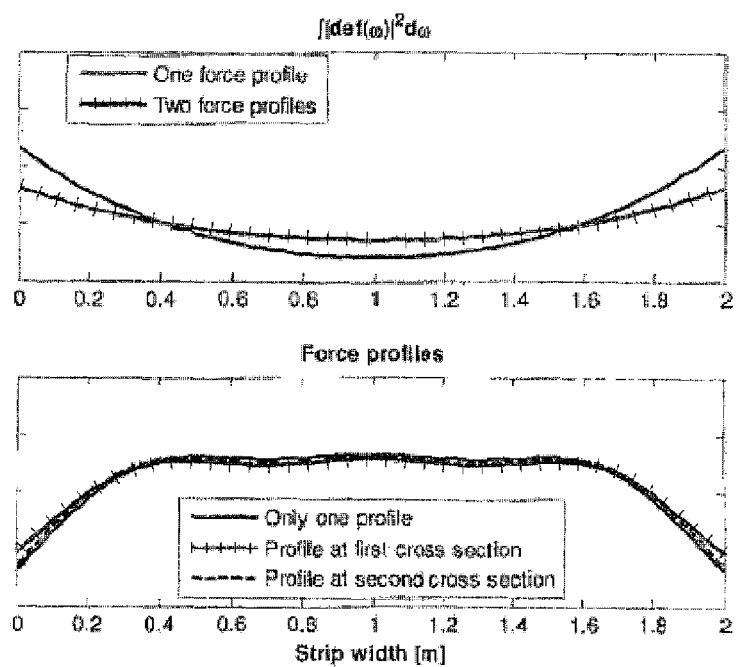
FIG. 4 illustrates mean square deflection amplitude along a cross section of the metal strip.

FIG. 4 illustrates the mean square deflection amplitude along a cross section of the metal strip. The mean square deflection amplitude is defined as the integral over frequencies of the square of the deflection amplitude, $\int |def(\omega)|^2 d\omega$. With reference first to the upper figure, two cases are illustrated: the first plot, denoted "one force profile", is the result of applying forces only at the same cross section as where the deflection is measured, e.g. at height h/2. The second plot, denoted "two force profile", is the result of applying forces also at a cross section a distance (height) above the first above. For both cases, the applied force profiles are optimized to give, in the mean, a maximally flat deflection. The force profiles are illustrated in the lower figure: the optimized single force profile, the force profile at the fist cross section and the force profile at the second cross section.

The deflection at a certain cross section of the suspended metal strip is described as a linear combination of base shapes. The amplitude of one deflection shape is controlled by manipulating the amplitude of a force profile applied at a cross section of the metal strip or by a combination of force profiles applied at several cross sections.

The force profiles are applied by combining the effects of several force actuators. There is no limit to the number of actuators that can be used to form one force profile. The amplitudes of the deflection profiles may be estimated through measurements of the deflection of the metal strip.

Besides the stabilization of metal strips, i.e. the reduction of vibrations, there is also a desire to control the static deflection profile along a cross section of the metal strip. This control of the static, or mean, deflection profile is denoted shape control. The metal strip may be exposed to a static deflection, which should be prevented.

The control actions aiming at reducing the metal strip vibrations must be very fast. This puts a limit on the distance between the positions where the actuators apply the stabilizing forces and the positions where the deflections are measured. In particular, the deflection measurement points, i.e. the placement of the sensors, as well as the placement of the actuators, should be as close as possible to the location at which stabilization is to be achieved. For example, during an air-knife process step, wherein excess zinc is blown off from the metal strips, it would be desirable to place the sensors and the actuators as close to the flowing air as possible. This is rarely possible, at least not for the actuators, due to physical restrictions such as the size of the electromagnets and limited space along the processing line.

In contrast to this, the control of the static deflection profile, the shape control, can be significantly slower. Further, the placement of the sensors and the actuators is less critical. For the shape control, it is possible to measure at a larger distance from the actuators and still obtain a satisfactory accuracy.

In accordance with an embodiment of the invention, the forces may be applied by the actuators, wherein the forces applied by the actuators are divided into two parts, one part acting fast in order to reduce the vibrations measured in the direct vicinity of the actuators, and a second part that more slowly corrects the metal strip profile at some distance away from the actuators. In this embodiment of the invention, selective ones of the actuators may be used in dependence on the aim of the movement control, i.e. depending on if the vibrations are to be controlled or if the static shape of the metal strip is to be controlled.

In particular, at least two rows of sensors 3, 3'; 4, 4', arranged at different heights, e.g. at height $h_1$ and $h_2$, are provided. Two different deflection profiles are then determined, a first deflection profile at height $h_1$ and a second deflection profile at height $h_2$, based on respective sets of distance measurements provided by the different rows of sensors 3, 3'; 4, 4'. Combinations of force profiles are determined, as described above. For controlling the shape, slowly varying amplitudes are used for, in average, controlling one of the deflection profiles. For the vibration control, more rapid variations are used for controlling the other deflection profile. The magnetic forces applied by the actuators are divided into slowly varying parts used to provide shape control and fast variations around the levels provided by the slowly varying signals are used for providing vibration control.

The controlled static metal strip deflection profile could even come from an inferential measure closely correlated to the strip profile. For example, specially adapted sensors could be used that measures the thickness of the metal strip and controls the shape based thereon. An example comprises on-line measurements of zinc thickness in continuous galvanization. It is realized that e.g. the zinc thickness can be obtained in a number of different ways, by direct measurements or indirect measurements.

Figure 5:
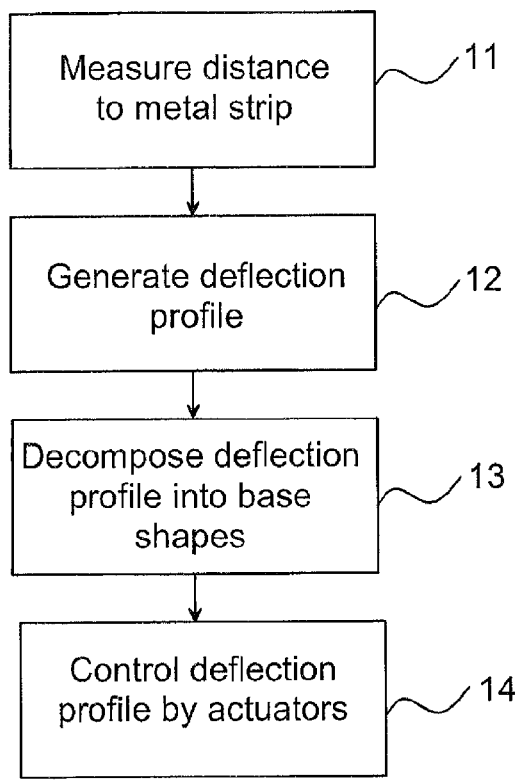
FIG. 5 illustrates a flow chart over step of a method in accordance with the invention.

With reference now to FIG. 5, the present invention thus provides a method 10 for vibration damping and shape control of a suspended metal strip 1, for example during transport in a processing facility. The method comprises the first step of measuring 11 distance to the metal strip 1 by means of a plurality of non-contact sensors 3. Thereby distance measurements are provided. It is noted that the sensors 3 may be arranged at different heights of the metal strip 1 and that several sets of distance measurements may be provided, one set of distance measurements corresponding to one height.

The method comprises the second step of generating 12 a deflection profile based on the obtained distance measurements. The deflection profile is thus approximated by means of the distance measurements.

The method comprises the third step of decomposing 13 the deflection profile to a number of base shapes I, II, III, IV, V. That is, the deflection profile is expressed as a sum of base shapes. Coefficients may for example be determined, that describe the contribution from each base shape to the deflection profile. That is, the contribution from base shape I can be expressed by a coefficient $a_1$, the contribution from base shape II can be expressed by a coefficient $a_2$, the contribution from base shape i can be expressed by a coefficient $a_i$ and so on. Such coefficients are typically time dependent. The deflection profile thus being a sum of base shapes: $a_1 I + a_2 II + a_3 III + a_4 IV + a_5 V$.

The coefficients ($a_1, a_2, a_3, a_4, a_5$) are then used for determining an amplitude of a corresponding combination of force profiles for a particular base shape; coefficient $a_1$ is used for determining an amplitude for a particular combination of force profiles for base shape I, etc. That is, the combination of force profiles that best counteract the deflection caused by that particular base shape.

If several sensors arranged at different heights are used, then a corresponding number of deflection profiles can be determined. For each deflection profile, a number of force profiles may be established based on different sets of actually measured distances, the measurements made by the respective rows of sensors. In an embodiment, all force profiles are used for controlling the deflection profiles. If for example two deflection profiles are available, a slow regulation (for shape control) may be used for controlling one of the deflection profiles and a fast regulation (for damping vibrations) may be used for controlling the other deflection profile.

The method comprises the fourth step of controlling 14 the deflection profile by a plurality of non-contact actuators 2a, 2b, 2a', 2b'. The step of controlling comprises providing for each base shape I, II, III, IV, V a corresponding combination of force profiles. Each combination may comprise at least two force profiles.

In an embodiment of the invention, each of the corresponding combination of force profiles is based on a first force profile calculated at a first height $h_1$ and a second force profile calculated at a second height $h_2$ of the metal strip 1. A combined force profile may then be provided for the respective base shape, based on the first and second force profiles.

A total force applied to the metal strip 1 by the actuators may finally be provided by adding together all the force profile combinations.

The plurality of non-contact actuators arranged in rows 2a, 2b; 2a', 2b' are preferably arranged along the width of the metal strip 1 at the first and at the second height $h_1, h_2$ of the metal strip 1.

Figure 6:
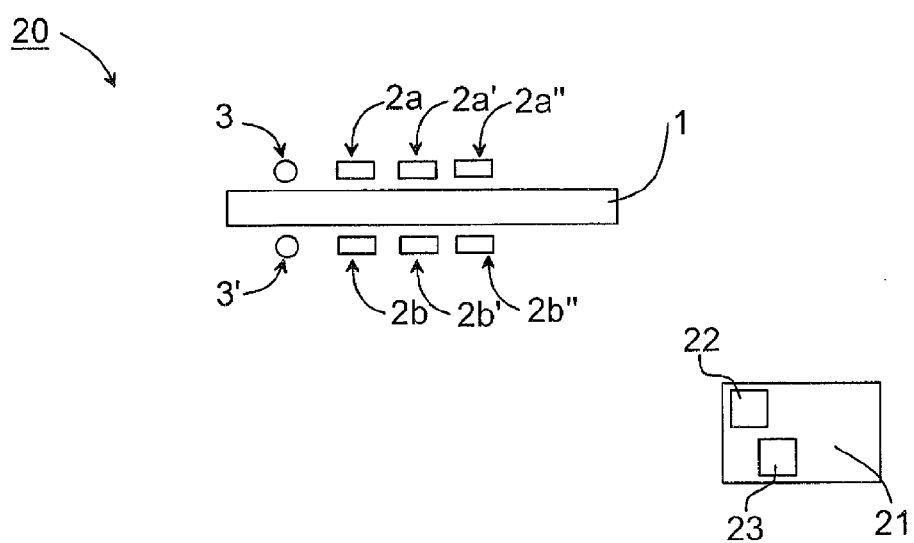
FIG. 6 illustrates schematically a system in accordance with the invention.

The invention also provides a corresponding system, comprising means for performing the method as described above, i.e. the method for vibration damping and/or shape control of a suspended metal strip 1, for example during transport in a processing facility. In particular, with reference to FIG. 6, the system 20 comprises sensors 3 arranged to measure the distance to the metal strip 1 and any number of actuators in any number of rows 2a, 2b; 2a', 2b'; 2a", 2b" arranged along the width of the metal strip 1, at different heights thereof, as described above. The system 20 further comprises means 21 for performing the method 10 as described above. Such means 21 may be any suitable processing means, for example a microprocessor or computer, whereby the method is implemented by means of software 22, hardware, firmware or any combination thereof. The means 21 also comprises means 23 for controlling the actuators 2a, 2b; 2a', 2b'; 2a", 2b", e.g. determining the forces to be applied by the respective actuators and sending control commands to the actuators for effectuating these forces.

What is claimed is:

1. A method for vibration damping and/or shape control of a suspended metal strip, the method comprising the steps of:
    measuring distance to said metal strip by a plurality of non-contact sensors,
    providing distance measurements,
    generating a deflection profile based on said distance measurements,
    decomposing said deflection profile into a number of base shapes, and
    controlling said deflection profile by a plurality of non-contact actuators, said step of controlling comprising providing for each of said base shapes a corresponding combination of force profiles,
    said step of controlling said deflection profile comprises optimizing said combinations of force profiles so as to provide in mean a maximally flat deflection of said metal strip;
    wherein at least two rows of said sensors are arranged at a first height and a second height of said metal strip and wherein the method comprises the further steps of:
    determining a first deflection profile at said first height and determining a second deflection profile at said second height, and
    performing shape control of said metal strip based on said first deflection profile and performing vibration control based on said second deflection profile.

2. The method as claimed in claim 1, wherein each combination of force profiles is based on at least a first force profile calculated at a first height of said metal strip and a second force profile calculated at a second height of said metal strip.

3. The method as claimed in claim 2, wherein said plurality of non-contact actuators are arranged along a width of said metal strip at said first height and at said second height, respectively.

4. The method as claimed in claim 1, wherein said step of decomposing said deflection profile into said base shapes comprises determining coefficients for the respective contributions.

5. The method as claimed in claim 4, wherein said coefficients are used for determining an amplitude of a combination of force profiles corresponding to a particular base shape.

6. The method as claimed in claim 1, comprising the further step of:
    providing a total force applied to the metal strip by said non-contact actuators by adding together all said combinations of force profiles.

7. The method as claimed in claim 1, wherein said non-contact actuators comprises electromagnets.

8. The method as claimed in claim 1, wherein the forces applied by said actuators are divided into a slowly varying part used to provide said shape control and a fast varying part around the levels provided by signals of said slowly varying part used for providing said vibration control.

9. The method as claimed in claim 1, wherein said combination comprises at least two force profiles.

10. The method as claimed in claim 1, wherein the number of said non-contact actuators and/or sensors is independent of the number of base shapes.

11. A system for vibration damping and/or shape control of a suspended metal strip, the system comprising:
    a plurality of non-contact sensors measuring distance to said metal strip thereby providing distance measurements, said sensors are arranged in at least two rows at a first height and a second height of said metal strip,
    means for generating a deflection profile based on said distance measurements,
    means for decomposing said deflection profile to a number of base shapes,
    a plurality of non-contact actuators,
    means for determining the contribution from each base shape to the deflection profile, and
    means for controlling said deflection profile by said plurality of non-contact actuators, said controlling comprising providing for each base shape a corresponding combination of force profiles, said combination comprising at least two force profiles,
    said means for controlling said deflection profile comprises optimizing said combinations of force profiles so as to provide in mean a maximally flat deflection of said metal strip.

12. The system as claimed in claim 11, wherein each of said corresponding force profiles is based on a first force profile calculated at said first height and a second force profile calculated at said second height of said metal strip.

13. The system as claimed in claim 12, wherein said non-contact actuators comprise electromagnets.

* * * * *